(12) United States Patent
Peng et al.

(10) Patent No.: US 8,986,589 B2
(45) Date of Patent: Mar. 24, 2015

(54) CARRIER TRAY AND METHOD FOR MANUFACTURING THEREOF

(75) Inventors: Jen-Wei Peng, Hsin-Chu (TW); Shih-Chi Chen, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 167 days.

(21) Appl. No.: 13/594,427

(22) Filed: Aug. 24, 2012

(65) Prior Publication Data

US 2013/0319905 A1  Dec. 5, 2013

(30) Foreign Application Priority Data

Jun. 1, 2012  (TW) .............................. 101119837 A

(51) Int. Cl.
| | |
|---|---|
| B29C 59/00 | (2006.01) |
| B29C 51/10 | (2006.01) |
| B29C 51/34 | (2006.01) |
| B65D 1/34 | (2006.01) |
| B65D 81/02 | (2006.01) |
| B29C 51/08 | (2006.01) |
| B29C 51/36 | (2006.01) |

(52) U.S. Cl.
CPC .............. *B29C 51/10* (2013.01); *B29C 51/082* (2013.01); *B29C 51/34* (2013.01); *B29C 51/36* (2013.01); *B29C 2791/006* (2013.01); *B65D 1/34* (2013.01); *B65D 81/025* (2013.01); *B65D 2585/6835* (2013.01)
USPC .......................................... 264/299; 264/318

(58) Field of Classification Search
CPC .... B29C 33/44; B29C 37/0014; B29C 43/42; B29C 51/34
USPC ................................................. 264/318, 299
See application file for complete search history.

(56) References Cited

U.S. PATENT DOCUMENTS

| | | | | |
|---|---|---|---|---|
| 3,712,787 A | * | 1/1973 | Barnes ........................ | 425/438 |
| 4,777,004 A | * | 10/1988 | Galer ........................... | 264/320 |
| 2006/0027314 A1 | | 2/2006 | Jones et al. | |

FOREIGN PATENT DOCUMENTS

| | | |
|---|---|---|
| CN | 101100108 A | 1/2008 |
| CN | 201801081 U | 4/2011 |
| JP | H07-009546 A | 1/1995 |
| JP | H10-100242 A | 4/1998 |
| JP | 2006-51819 A | 2/2006 |
| TW | 200940425 A | 10/2009 |
| TW | M399797 U1 | 3/2011 |
| TW | M421314UA | 1/2012 |
| WO | WO 97/35700 A1 | 10/1997 |
| WO | WO 2011/040758 A2 | 4/2011 |

\* cited by examiner

*Primary Examiner* — Galen Hauth
(74) *Attorney, Agent, or Firm* — Muncy, Geissler, Olds & Lowe, P.C.

(57) ABSTRACT

A method for manufacturing a carrier tray includes softening and disposing a plastic film on a first mold, wherein the first mold includes a top surface and a first lateral surface, the top surface includes a recession and a first edge, the first lateral surface is connected to the top surface and extends from the first edge, and the first lateral surface and the top surface form a first included angle; attaching the plastic film to the top surface and the first lateral surface; disposing a restorer on an outer side of the first mold; separating the first mold from the plastic film, wherein the plastic film is pushed by the first lateral surface such that the restorer is moved from an initial position to a final position; and pushing the plastic film from the final position to the initial position by the restorer; and cooling the plastic film.

9 Claims, 19 Drawing Sheets

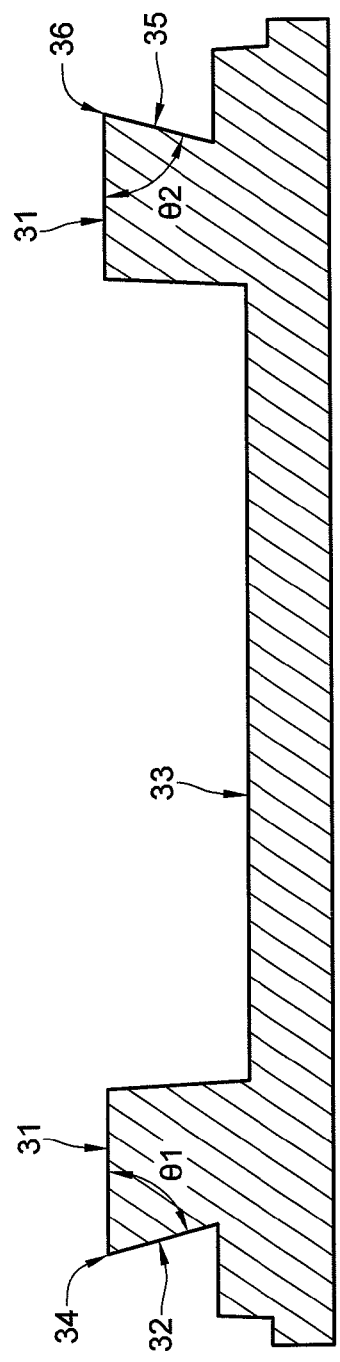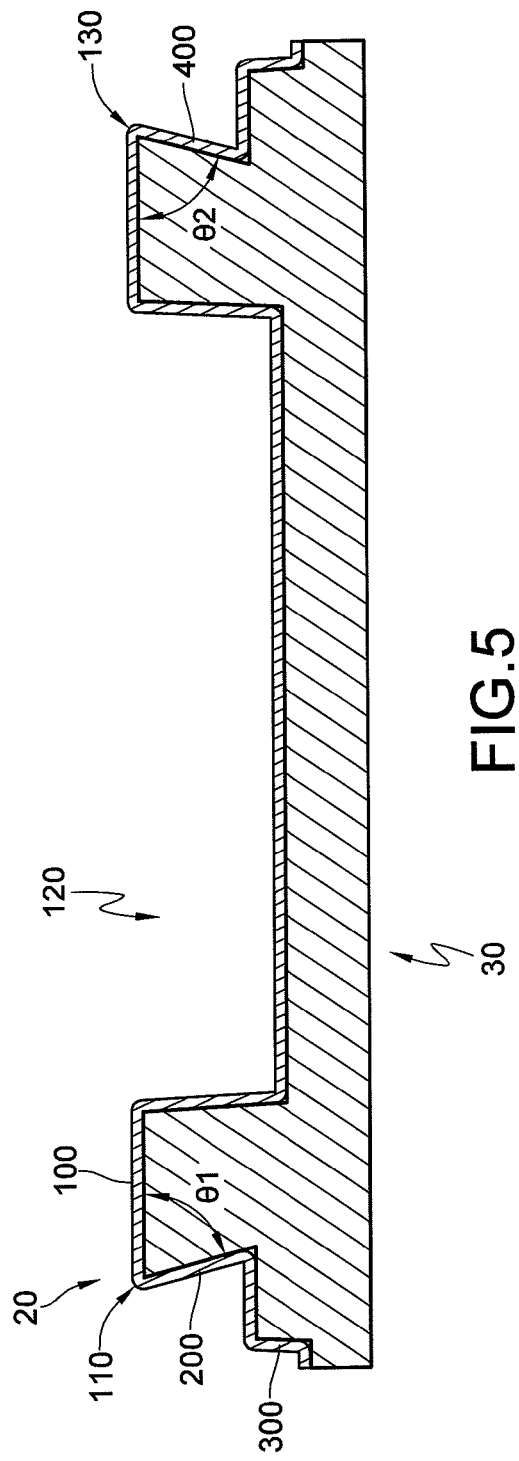

CARRIER TRAY AND METHOD FOR MANUFACTURING THEREOF

CROSS-REFERENCE TO RELATED APPLICATIONS

This non-provisional application claims priority under 35 U.S.C. §119(a) on Patent Application No(s). 101119837 filed in Taiwan, R.O.C. on Jun. 1, 2012, the entire contents of which are hereby incorporated by reference.

BACKGROUND

1. Technical Field

The present disclosure relates to a container for storing and transporting an object, and more particularly, to a carrier tray and a method for manufacturing thereof for storing and transporting an electronic component.

2. Related Art

Generally speaking, a carrier tray is utilized for the storage and transportation of a finished product or a semi-finished product of a liquid crystal display (LCD) panel in conventional technology. Moreover, in order to save the needed space for storing and transporting the finished product or the semi-finished product, these carrier trays all have a stacked structure for being overlapped with each other. In detail, when these carrier trays are overlapped with each other, a sidewall of an upper carrier tray is mounted on a top plate of a lower carrier tray to form a containing room together. The containing room is used for containing the finished product or the semi-finished product of the LCD panel and protecting the finished product or the semi-finished product from damage during storage or transportation.

In general, a thermoplastic plastic film is provided to be deformed into a carrier tray by hot pressing. However, during manufacturing of the carrier tray, because of the problem of a mold removal, the included angle between the sidewall and the top plate would be restricted, which leads to a poor whole structural strength of the carrier trays overlapped with each other. If the whole structural strength of the conventional carrier trays overlapped with each other is poor, the problem that the upper carrier bumps into the panel on the lower carrier tray may be occurred during the storage or transportation of the panel. Based on the above-mentioned problem, how to improve a method for manufacturing the carrier tray to advance the whole structural strength of the carrier trays overlapped with each other is important.

SUMMARY

An embodiment discloses a carrier tray comprising a top plate and a first sidewall. The top plate comprises a first side edge and a containing room. The first sidewall is connected to the top plate and is extended from the first side edge. The containing room and the first sidewall are disposed on the same side of the top plate. The first sidewall and the top plate form a first included angle of between 73 and 78 degrees therebetween.

Another embodiment discloses a method for manufacturing a carrier tray comprising softening a plastic film having thermoplastic properties and disposing the plastic film on a first mold, wherein the first mold comprises a top surface and a first lateral surface, the top surface comprises a recession and a first edge, the first lateral surface is connected to the top surface and extends from the first edge, and the first lateral surface and the top surface form a first included angle therebetween; attaching the plastic film to the top surface and the first lateral surface; disposing a restorer on an outer side of the first mold such that the plastic film is disposed between the first lateral surface and the restorer; removing the first mold from the plastic film, wherein a portion of the plastic film is pushed by the first lateral surface such that the restorer is moved from an initial position to a final position; pushing the plastic film from the final position to the initial position by the restorer; and cooling the plastic film.

BRIEF DESCRIPTION OF THE DRAWINGS

The present disclosure will become more fully understood from the detailed description given herein below for illustration only, and thus are not limitative of the present disclosure, and wherein:

FIGS. 4 to 10 are cross-sectional schematic views of manufacturing a carrier tray corresponding to each step in FIG. 3;

DETAILED DESCRIPTION

The detailed features and advantages of the disclosure are described below in great detail through the following embodiments, the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

Figure 1:
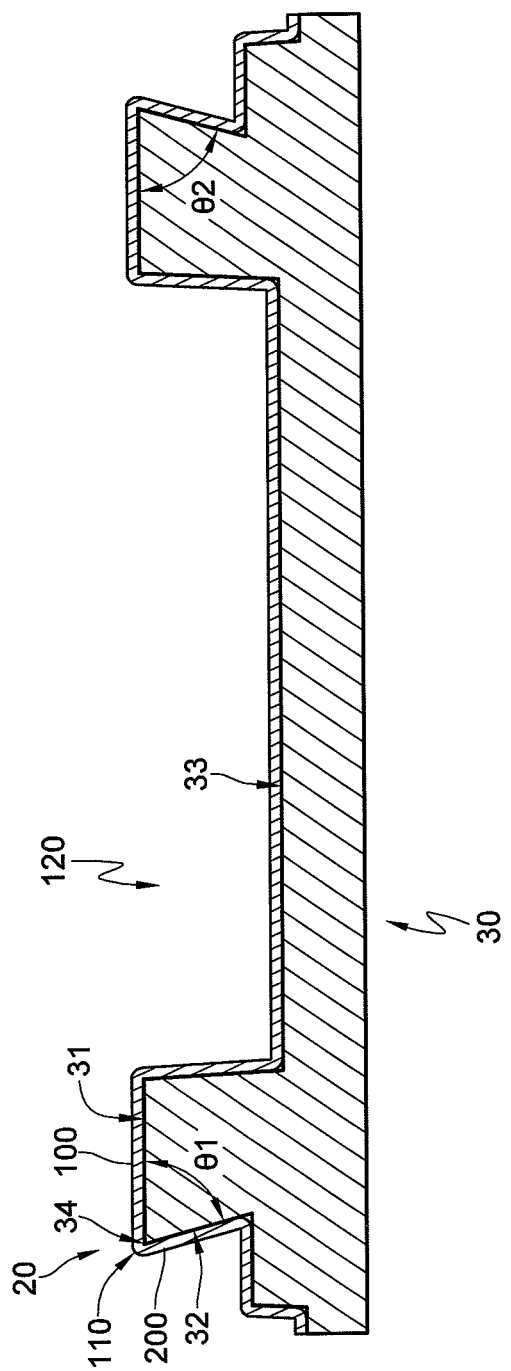
FIGS. 1 and 2 are a portion of process cross-sectional views of manufacturing a carrier tray.
Figure 2:
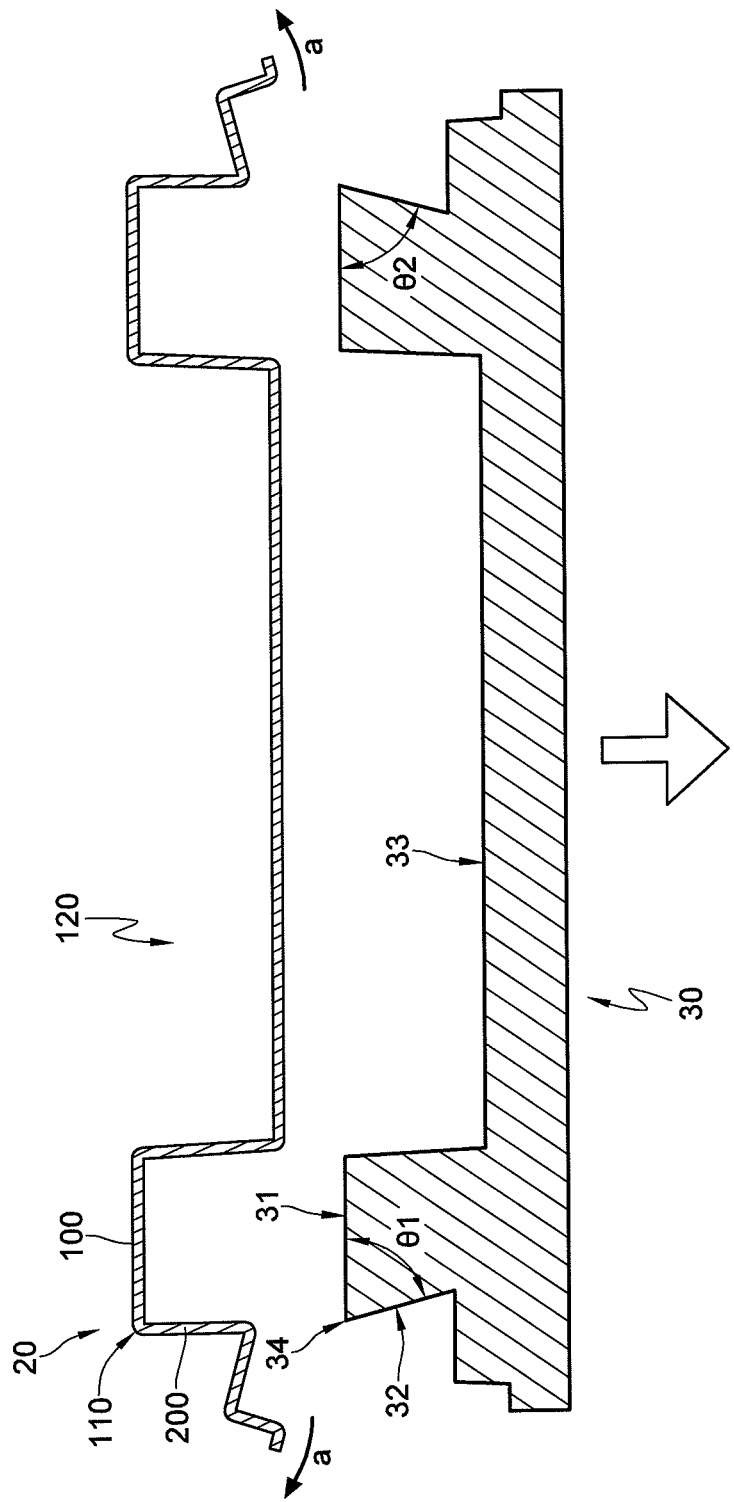

Based upon the importance of advancing whole structural strength of carrier trays overlapped with each other, the inventor is aware that when the included angle between a top plate and a sidewall of each carrier tray is reduced, the contact area between a sidewall of an upper carrier tray and a top plate of a lower carrier tray is increased, thereby advancing the whole structural strength of the carrier trays overlapped with each other. However, the inventor finds that when the included angle between the top plate and the sidewall is designed to be greatly reduced, an unexpected deformation of the carrier trays may be occurred. The following describes the unexpected deformation problem of the carrier trays in detail. Please refer to FIGS. 1 and 2. FIGS. 1 and 2 are a portion of process cross-sectional views of manufacturing a carrier tray.

As shown in FIG. 1, during the process of manufacturing a carrier tray 10, first, heat and soften a plastic film 20 having thermoplastic properties, and attach the plastic film 20 to a first mold 30 whose shape corresponds to that of the carrier tray 10. The first mold 30 comprises a top surface 31 and a first lateral surface 32. The top surface 31 comprises a recession 33 and a first edge 34. The first lateral surface 32 is connected to the top surface 31 and extends from the first edge 34. The first lateral surface 32 and the top surface 31 forms a first included angle $\theta_1$ therebetween. For example, the first included angle $\theta_1$ is between 73 to 78 degrees.

Because the softened plastic film 20 has plastic deformation properties, a vacuum forming technology may be applied to the softened plastic film 20, such that the plastic film 20 may be attached to the first mold 30 to be deformed into the carrier tray 10. In this way, the carrier tray 10 comprises a top plate 100 whose shape corresponds to that of the top surface 31 and a first sidewall 200 whose shape corresponds to that of the first lateral surface 32. The top plate 100 comprises a first side edge 110 and a containing room 120 whose shape corresponds to that of the recession 33. The first sidewall 200 is connected to the top plate 100 and extends from the first side edge 110. The containing room 120 and the first sidewall 200 are disposed on the same side of the top plate 100. The first sidewall 200 and the top plate 100 have the same first included angle $\theta_1$ therebetween. The top plate 100 is disposed on the top surface 31, and the first sidewall 200 is disposed on the first lateral surface 32.

As shown in FIG. 2, after that, when the carrier tray 10 still has plastic deformation properties, remove the first mold 30 from the plastic film 20. Because the top plate 100 and the first sidewall 200 have the first included angle $\theta_1$ therebetween, the first sidewall 200 obstructs a removal passage of the first mold 30. Therefore, during the removal process of the first mold 30, a portion of the plastic film 20 (i.e. the first sidewall 200) is pushed by the first lateral surface 32 and is moved from an initial position to a final position (along a direction indicated by an arrow a) such that an unexpected deformation of the carrier tray 10 is generated.

Based upon the above description, when the included angle between the top plate 100 and the sidewall 200 of the carrier tray 10 is greatly reduced, the unexpected deformation of the carrier tray 10 is generated. As a result, the whole structural strength of the carrier trays 10 overlapped with each other is not advanced. Therefore, the following further describes an improved method for manufacturing a carrier tray and detailed steps hereinafter.

Figure 3:
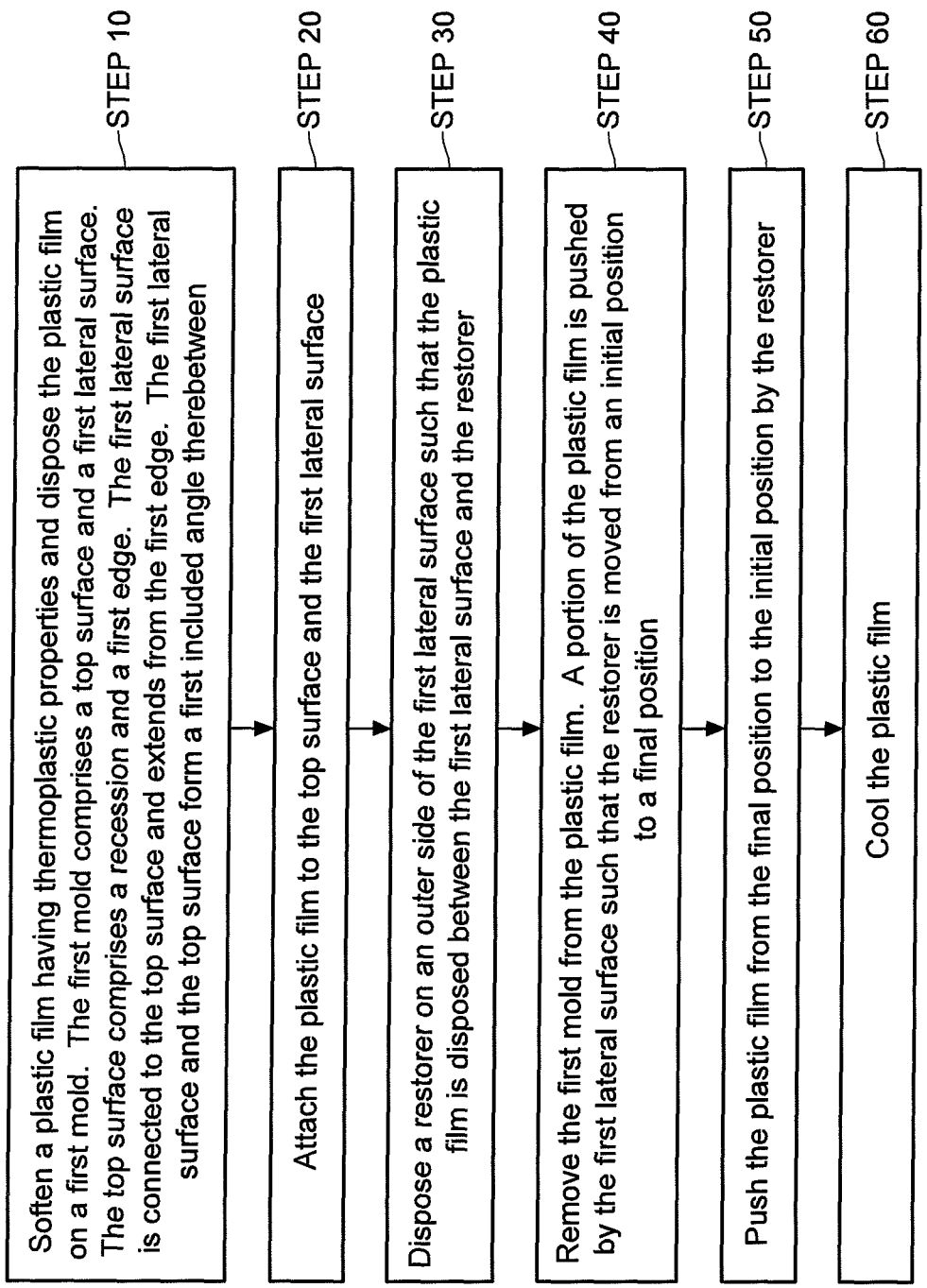
FIG. 3 is a flow chart of a method for manufacturing a carrier tray according to an embodiment.
Figure 14:
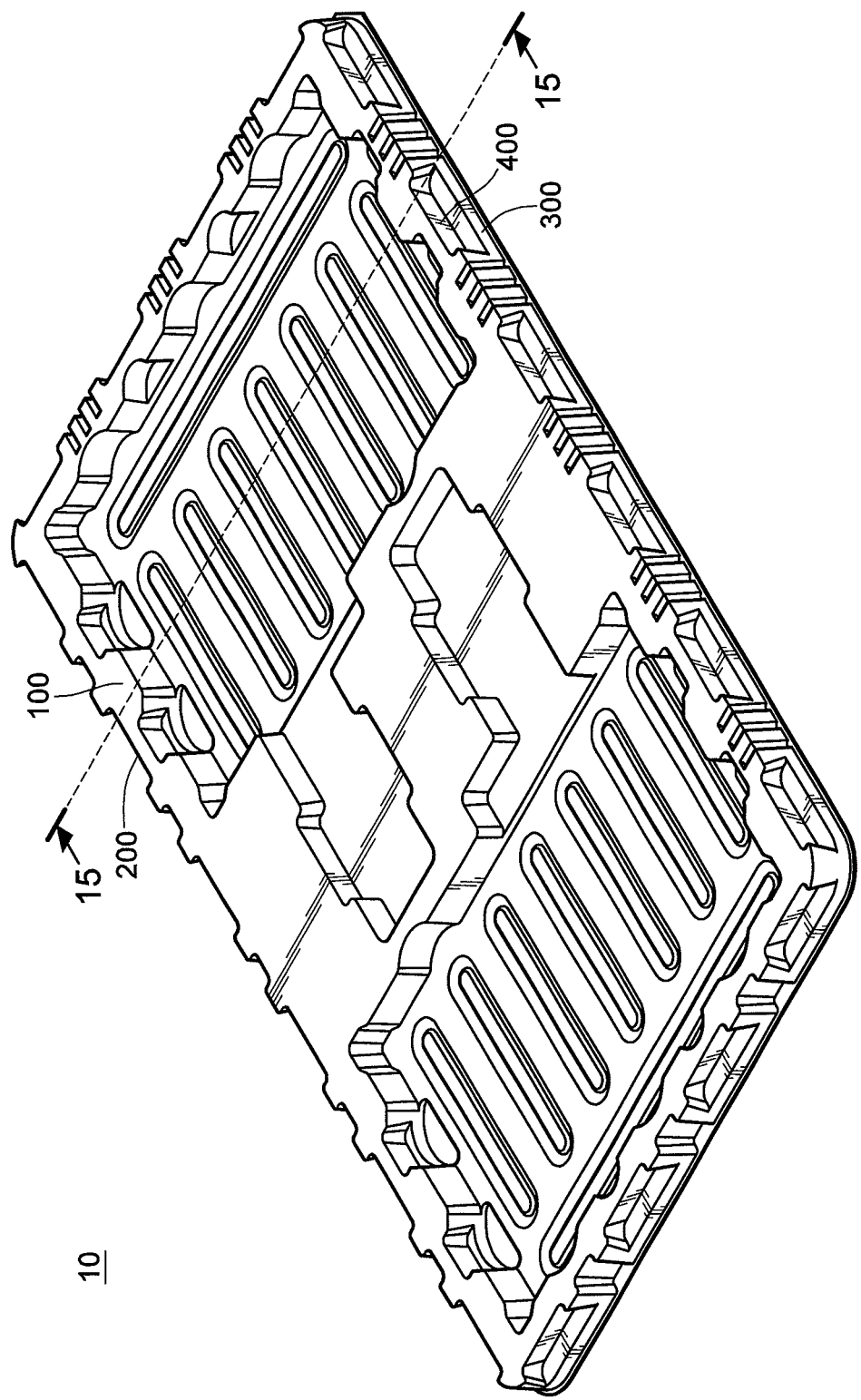
FIG. 14 is a perspective schematic view of a carrier tray manufactured by a method in FIG. 3.
Figure 15:
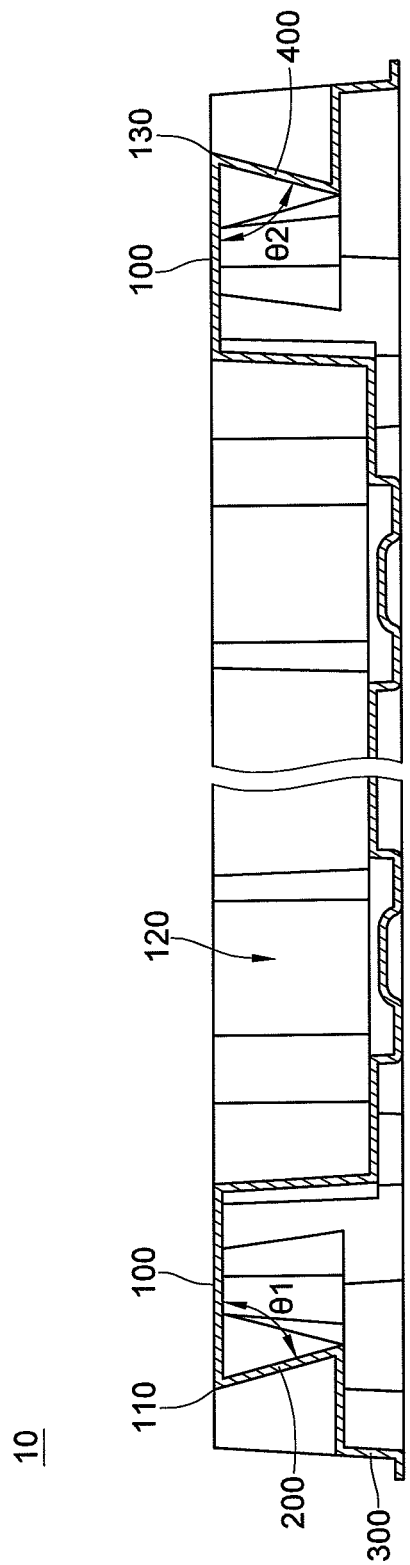
FIG. 15 is a cross-sectional schematic view along a cross-sectional line 15-15 in FIG. 14.

Please refer to FIGS. 3 to 10 and 14 to 15. FIG. 3 is a flow chart of a method for manufacturing a carrier tray according to an embodiment. FIGS. 4 to 10 are cross-sectional schematic views of manufacturing a carrier tray corresponding to each step in FIG. 3. FIG. 14 is a perspective schematic view of a carrier tray manufactured by a method in FIG. 3. FIG. 15 is a cross-sectional schematic view along a cross-sectional line 15-15 in FIG. 14.

The following describes Steps 10 to 60 in detail. As shown in FIGS. 3 to 5, a plastic film 20 having thermoplastic properties is heated to be softened, and the plastic film 20 is disposed on a first mold 30. The first mold 30 comprises a top surface 31 and a first lateral surface 32. The top surface 31 comprises a recession 33 and a first edge 34. The first lateral surface 32 is connected to the top surface 31 and is extended from the first edge 34. A first included angle $\theta_1$ is formed between the first lateral surface 32 and the top surface 31. In this embodiment, the first included angle $\theta_1$ is between 73 to 78 degrees. However, in other embodiments, the first included angle $\theta_1$ may be greater than or less than 78 degrees. Moreover, for example, the top surface 31, the first lateral surface 32 and the recession 33 comprise multiple vents connected to an air suction pump, respectively.

Because of the plastic deformation properties of the softened plastic film 20, when the air suction pump operates on the softened plastic film 20, the plastic film 20 influenced by the suction of the air suction pumps is attached to the top surface 31 and deformed, the first lateral surface 32 and the recession 33. In this way, the plastic film 20 is plastically deformed into the shape of a carrier tray 10. The carrier tray 10 comprises a top plate 100 and a first sidewall 200. The top plate 100 comprises a first side edge 110 and a containing room 120. The first sidewall 200 is connected to the top plate 100 and extends from the first side edge 110. The containing room 120 and the first sidewall 200 are disposed on the same side of the top plate 100. The first sidewall 200 and the top plate 100 also have the same first included angle $\theta_1$ therebetween. The top plate 100 is disposed on the top surface 31, and the first sidewall 200 is disposed on the first lateral surface 32.

Moreover, in other embodiments, the carrier tray 10 further comprises a base 300 connected to the first sidewall 200 such that the first sidewall 200 is disposed between the base 300 and the top plate 100.

Figure 6:
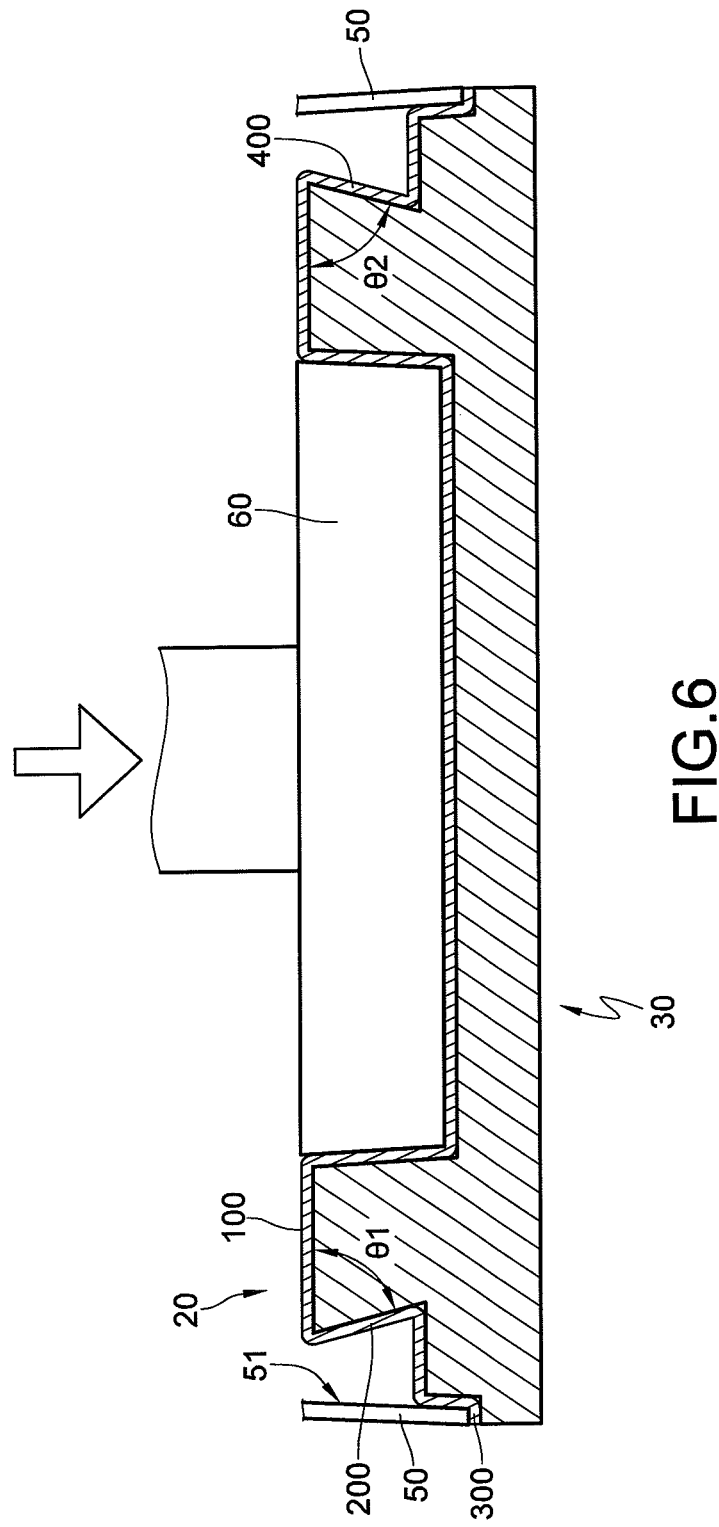

As shown in FIG. 6, before the first mold 30 is removed from the plastic film 20, a restorer 50 is disposed on an outer side of the first mold 30 such that the plastic film 20 is disposed between the first lateral surface 32 and the restorer 50. The restorer 50 has the capability of restoring the first sidewall 200 of the plastic film 20 to an original position. In this embodiment, the restorer 50 is a flexible ring-shaped structure surrounding the first mold 30 and the plastic film 20. The ring-shaped structure includes a first inner surface 51, and the first inner surface 51 faces the first lateral surface 32.

Moreover, during the step of disposing the restorer 50, a second mold 60 also may be utilized to make the plastic film 20 in the recession 33 being sandwiched between the first mold 30 and the second mold 60 such that the shape of the containing room 120 of the carrier tray 10 is enabled to accurately correspond to the shape of the recession 33. However, the sequence of disposing the restorer 50 and disposing the second mold 60 is not limited to the embodiment. The two steps are only needed to be implemented before the step of removing the first mold 30 from the plastic film 20.

Figure 7:
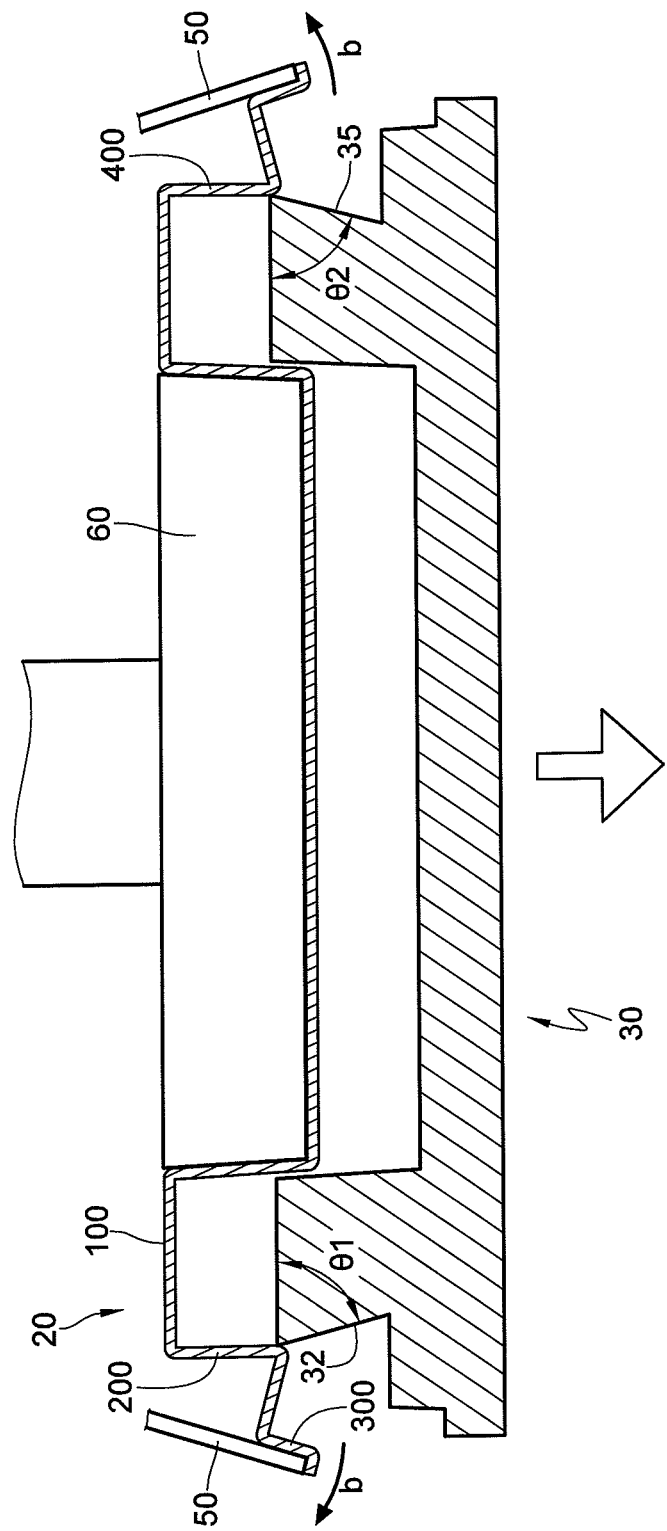

As shown in FIGS. 6 and 7, the first mold 30 is removed from the plastic film 20. Because the first included angle $\theta_1$ (about 73 to 78 degrees) is formed between the top plate 100 and the first sidewall 200, the first sidewall 200 obstructs a removal passage of the first mold 30. Therefore, during the removal process of the first mold 30, a portion of the plastic film 20 (i.e. the first sidewall 200) is pushed by the first lateral surface 32 such that the restorer 50 is moved from an initial position to a final position (along a direction indicated by an arrow b).

Figure 8:
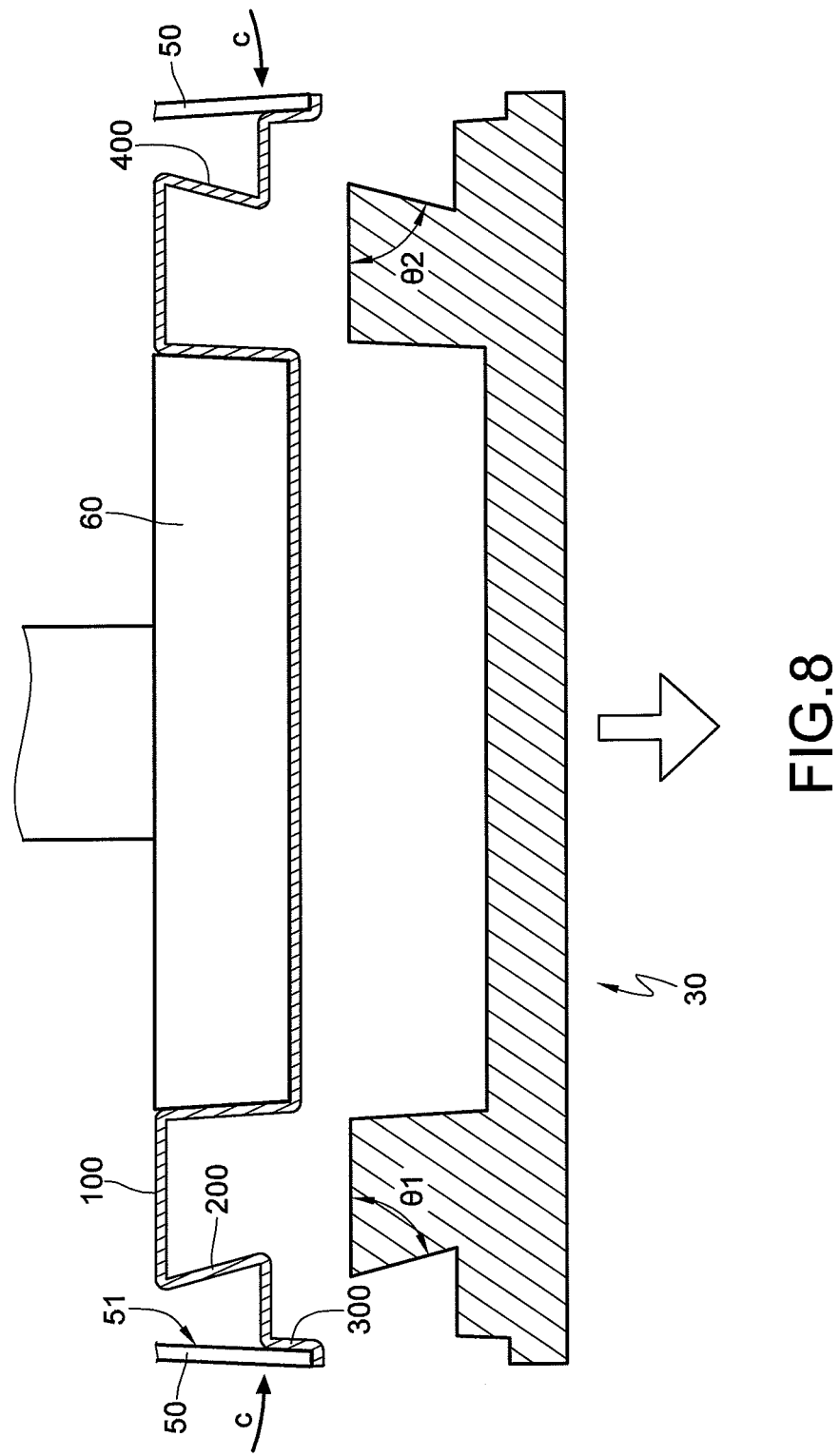

Afterwards, as shown in FIGS. 7 and 8, because the restorer 50 has flexibility, when the restorer 50 is pushed outwardly by the first lateral surface 32 and the plastic film 20 together, the restorer 50 stores a flexible restoring force. Until the first lateral surface 32 is completely removed from the plastic film 20, the restorer 50 starts to release the flexible restoring force to move the plastic film 20 from the final position to the initial position (along a direction indicated by an arrow c). In this way, before the carrier tray 10 is solidified, the first sidewall 200 is returned to the initial position, thereby avoiding defects.

Figure 9:
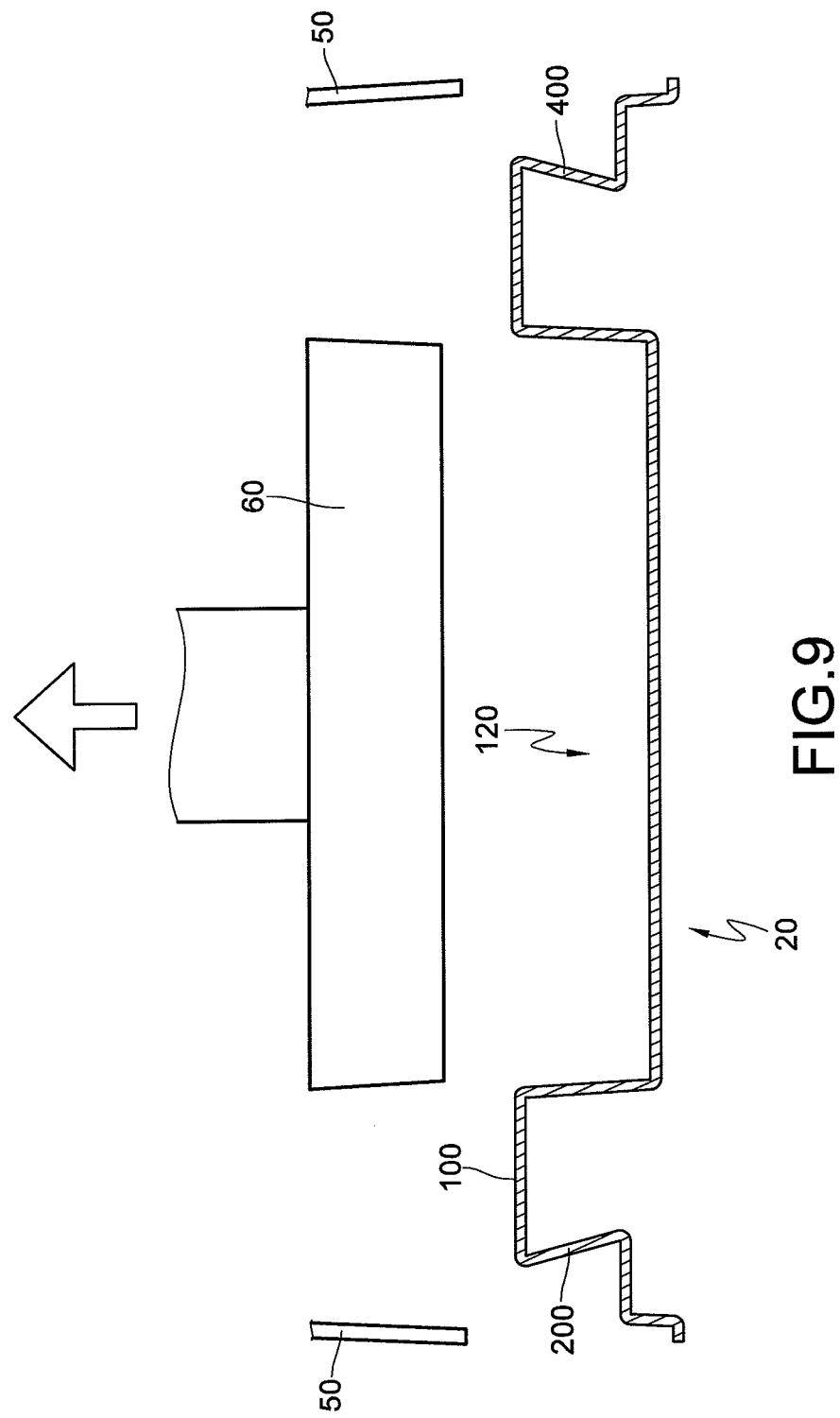
Figure 10:
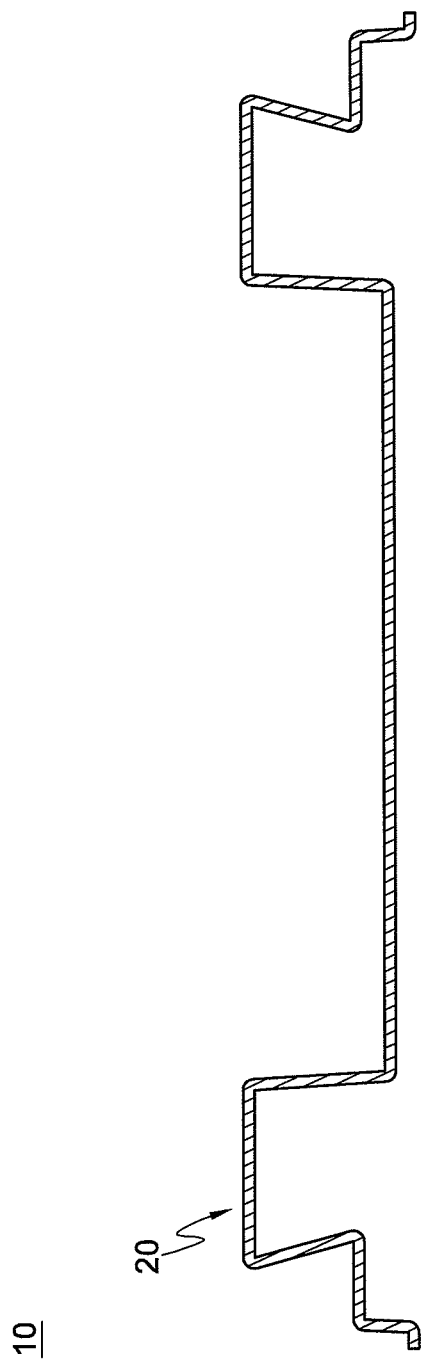

After that, as shown in FIGS. 9 to 10, after the step of removing the first mold 30 from the plastic film 20 and before the step of cooling the plastic film 20, the second mold 60 and the restorer 50 are separated from the plastic film 20 respectively. After that, the plastic film 20 is cooled to obtain the above-mentioned carrier tray 10.

The above-mentioned method for manufacturing the carrier tray 10 is described at a side of the carrier tray 10 and that of the first mold 30. The following describes another side of the carrier tray 10 and that of the first mold 30 together. Please refer to FIGS. 4 to 10 and 14 and 15 together. In this embodiment, the first mold 30 has a second lateral surface 35 which is at an opposite side of the first lateral surface 32. The top surface 31 comprises a second edge 36. The first edge 34 and the second edge 36 face to each other. The second lateral surface 35 extends from the second edge 36. A second included angle $\theta_2$ is formed between the second lateral surface 35 and the top surface 31. For example, the second included angle $\theta_2$ is between 73 to 78 degrees. By completely imitating the above-mentioned method for manufacturing, the carrier tray 10 comprises a second sidewall 400 whose shape corresponds to that of the second lateral surface 35. The second sidewall 400 extends from the second side edge 130, and the containing room 120 and the second sidewall 400 are disposed on the same side of the top plate 100. The second sidewall 400 and the top plate 100 have the same second included angle $\theta_2$, and when the first mold 30 is removed from the plastic film 20, the second sidewall 400 is also pushed by the second lateral surface 35 to move the restorer 50 from an initial position to a final position (along a direction indicated by an arrow b). In addition, until the second lateral surface 35 is completely removed from the plastic film 20, the restorer 50 is also pushed back to the initial position from the final position (along a direction indicated by an arrow c). However, the amount of the sidewalls 200, 400 connected to the top plate 100 and the position of the sidewalls 200, 400 are not limited to the embodiments.

Figure 11A:
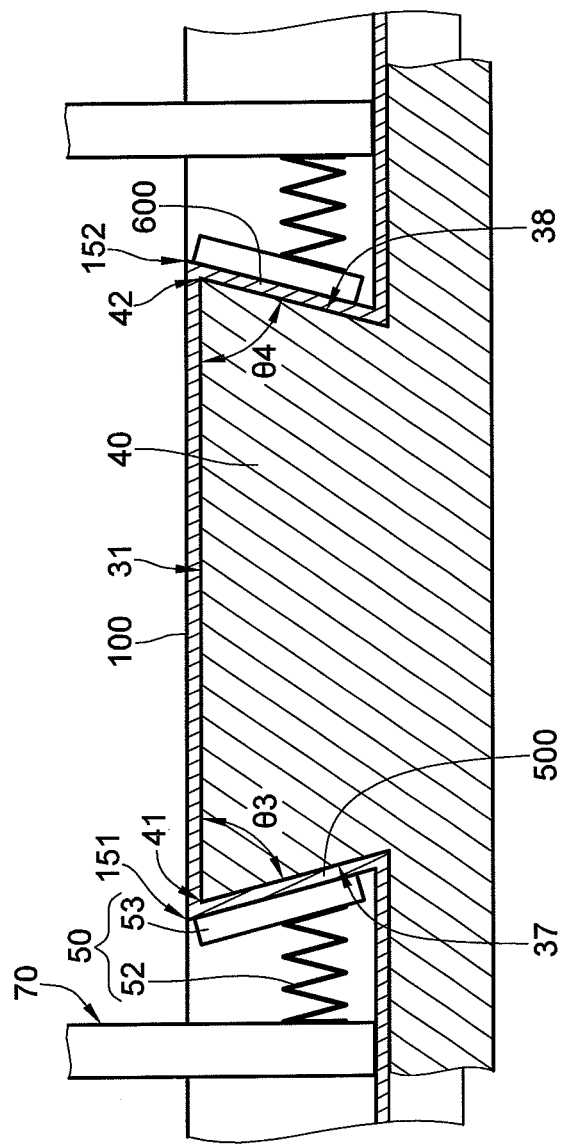
FIGS. 11A, 12 and 13 are cross-sectional schematic views of a step of removing a first mold in a method for manufacturing a carrier tray according to another embodiment.
Figure 11B:
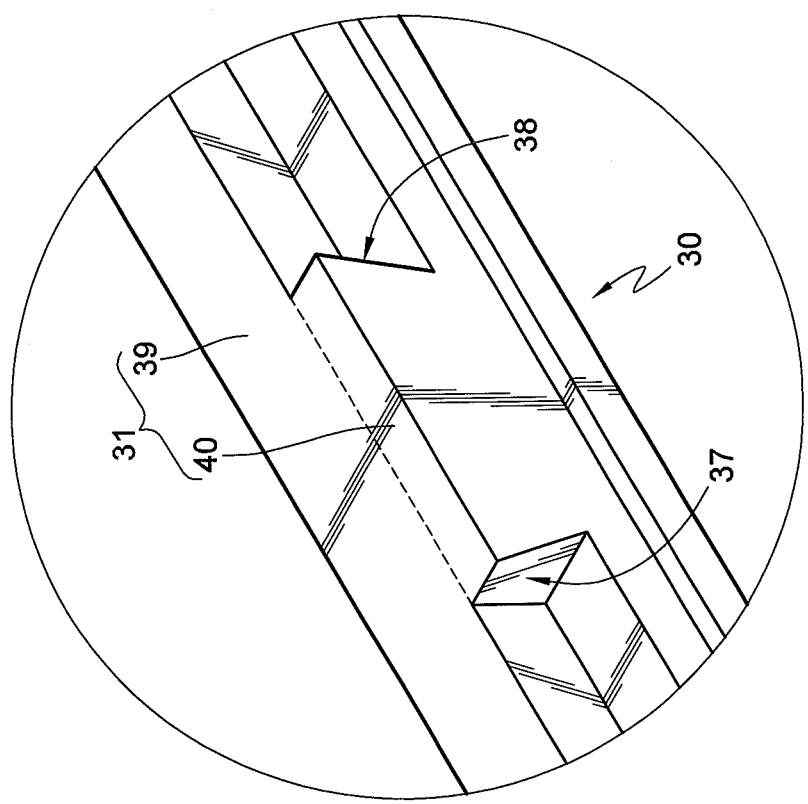
FIG. 11B is a perspective schematic view of a portion of a first mold in FIG. 11A.
Figure 12:
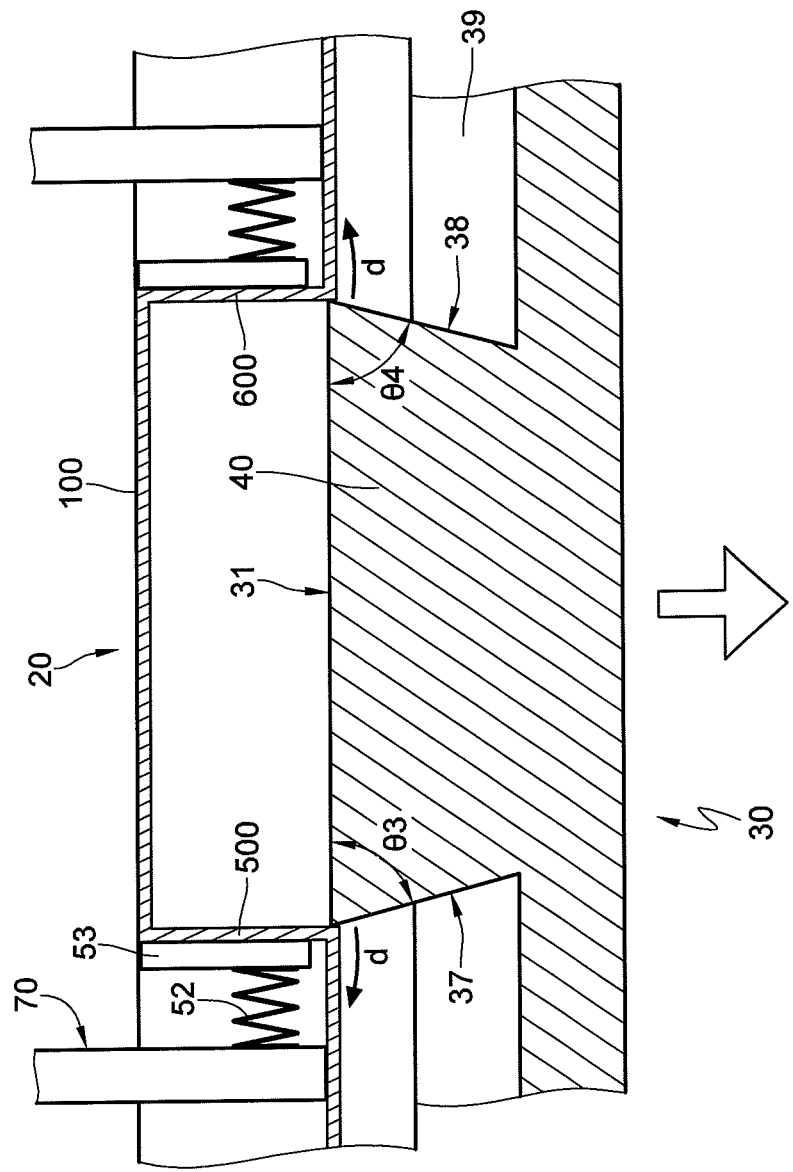
Figure 13:
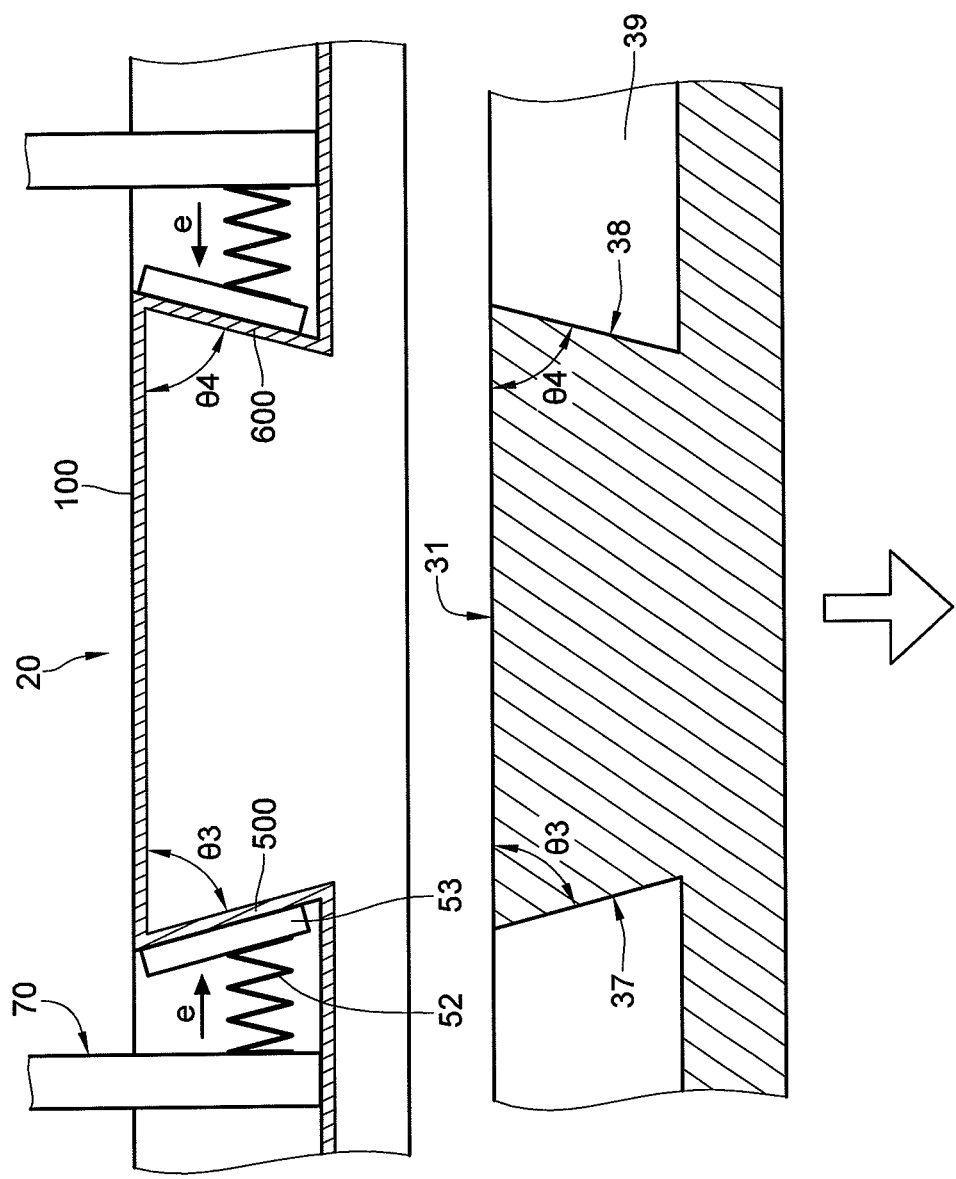
Figure 16:
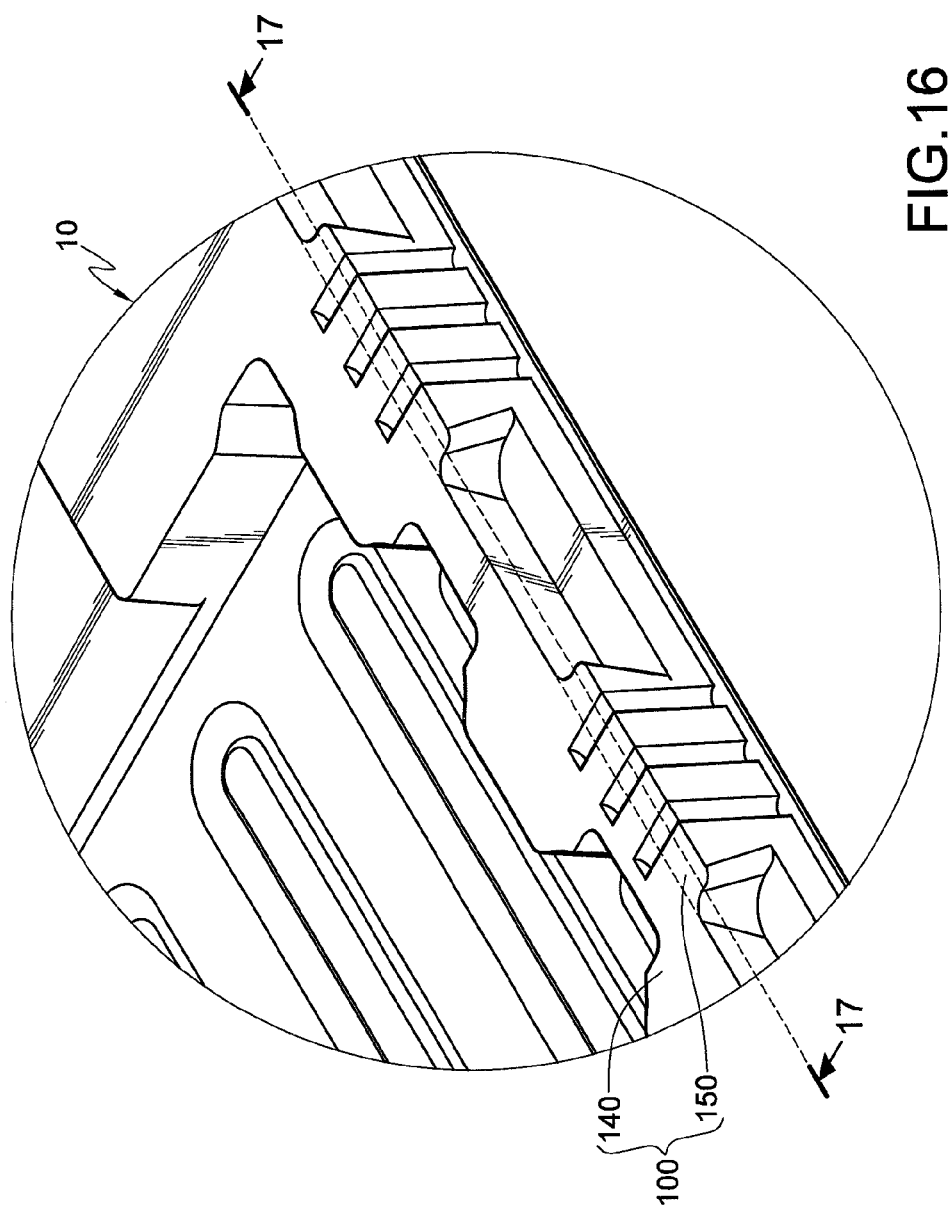
FIG. 16 is a perspective schematic view of a carrier tray according to another embodiment.
Figure 17:
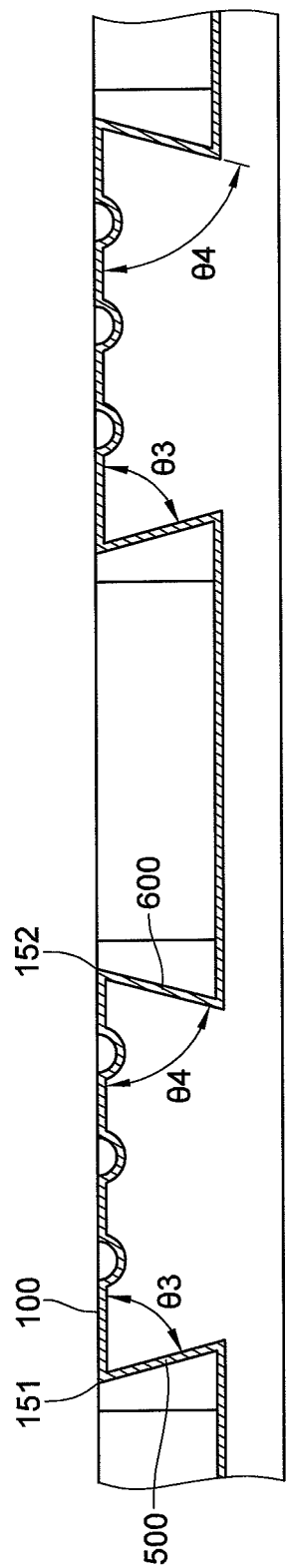
FIG. 17 is a cross-sectional schematic view of a carrier tray along a cross-sectional line 17-17 in FIG. 16.

The shapes of the carrier tray 10 are not limited to the above-mentioned embodiments. In other embodiments, the carrier trays 10 further have other kinds of stacked structures. Moreover, the restorer 50 is not limited to the ring-shaped structure according to the above-mentioned embodiments. In other embodiments, the restorer 50 further has other kinds of structure. Please refer to FIGS. 11A to 13 and 16 to 17. FIGS. 11A, 12 and 13 are cross-sectional schematic views of a step of removing a first mold in a method for manufacturing a carrier tray according to another embodiment. FIG. 11B is a perspective schematic view of a portion of a first mold in FIG. 11A. FIG. 16 is a perspective schematic view of a carrier tray according to another embodiment. FIG. 17 is a cross-sectional schematic view of a carrier tray along a cross-sectional line 17-17 in FIG. 16. The method for manufacturing in this embodiment is similar to that in FIG. 3, so only the differences are described herein.

In this embodiment, the first mold 30 comprises a third lateral surface 37 and a fourth lateral surface 38. The top surface 31 comprises a main body 39 and a protruding part 40. The protruding part 40 extends from the main body 39 toward outside the main body 39. The protruding part 40 comprises a third edge 41 and a fourth edge 42. The third edge 41 and the fourth edge 42 face to each other. The third lateral surface 37 is connected to the top surface 31 and extends from the third edge 41. The fourth lateral surface 38 is connected to the top surface 31 and extends from the fourth edge 42. The third lateral surface 37 and the top surface 31 form a third included angle $\theta_3$ therebetween. The fourth lateral surface 38 and the top surface 31 form a fourth included angle $\theta_4$. In this embodiment, the third included angle $\theta_3$ and the fourth included angle $\theta_4$ are between 73 and 78 degrees. The main body 39 in this embodiment may also comprise a recession (not shown), and the structure of the recession is similar to that of the recession 33 in FIG. 4.

Because the softened plastic film 20 has the plastic deformation properties, the plastic film 20 may be attached to the first mold 30 to be deformed into a carrier tray 10. In this way, the carrier tray 10 comprises a third sidewall 500 and a fourth sidewall 600, and the top plate 100 comprises a primary body 140 and a sticking out part 150. The shape of the third sidewall 500 corresponds to that of the third lateral surface 37. The shape of the fourth sidewall 600 corresponds to that of the fourth lateral surface 38. The shape of the primary body 140 corresponds to that of the main body 39. The shape of the sticking out part 150 corresponds to that of the protruding part 40. The primary body 140 may further comprise a containing room (not shown) corresponding to the recession. The sticking out part 150 comprises a third side edge 151 and a fourth side edge 152. The third sidewall 500 is connected to the top plate 100 and extends from the third side edge 151. The fourth sidewall 600 is connected to the top plate 100 and extends from the fourth side edge 152. The containing room, the third sidewall 500 and the fourth sidewall 600 are disposed on the same side of the top plate 100. The third sidewall 500 and the top plate 100 form a third included angle $\theta_3$ therebetween. The fourth sidewall 600 and the top plate 100 form a fourth included angle $\theta_4$ therebetween.

Before the first mold 30 is removed from the plastic film 20, a restorer 50 is needed to be disposed on an outer side of the first mold 30 in advance such that not only a portion of the plastic film 20 attached to the third lateral surface 37 is disposed between the third lateral surface 37 and the restorer 50 but also another portion of the plastic film 20 attached to the fourth lateral surface 38 is disposed between the fourth lateral surface 38 and the restorer 50. In this embodiment, the restorer 50 comprises two flexible components 52 and two restoring work pieces 53. An end of each of the two flexible components 52 is disposed on two fixed surfaces 70, respectively. The other end of each of the two flexible components 52 is connected to the two restoring work pieces 53, respectively. One of the two restoring work pieces 53 faces the third lateral surface 37, and the other restoring work piece 53 faces the fourth lateral surface 38.

However, when the first mold 30 is removed from the plastic film 20, the third sidewall 500 and the fourth sidewall 600 are also pushed by the third lateral surface 37 and the fourth lateral surface 38 such that the two restoring work pieces 53 are moved to a final position from an initial position, respectively (along a direction indicated by an arrow d). After that, until the third lateral surface 37 and the fourth lateral surface 38 are completely removed from the plastic film 20, the two restoring work pieces 53 also pushes the third sidewall 500 and the fourth sidewall 600 from the final position to the initial position (along a direction indicated by an arrow e).

Figure 18:
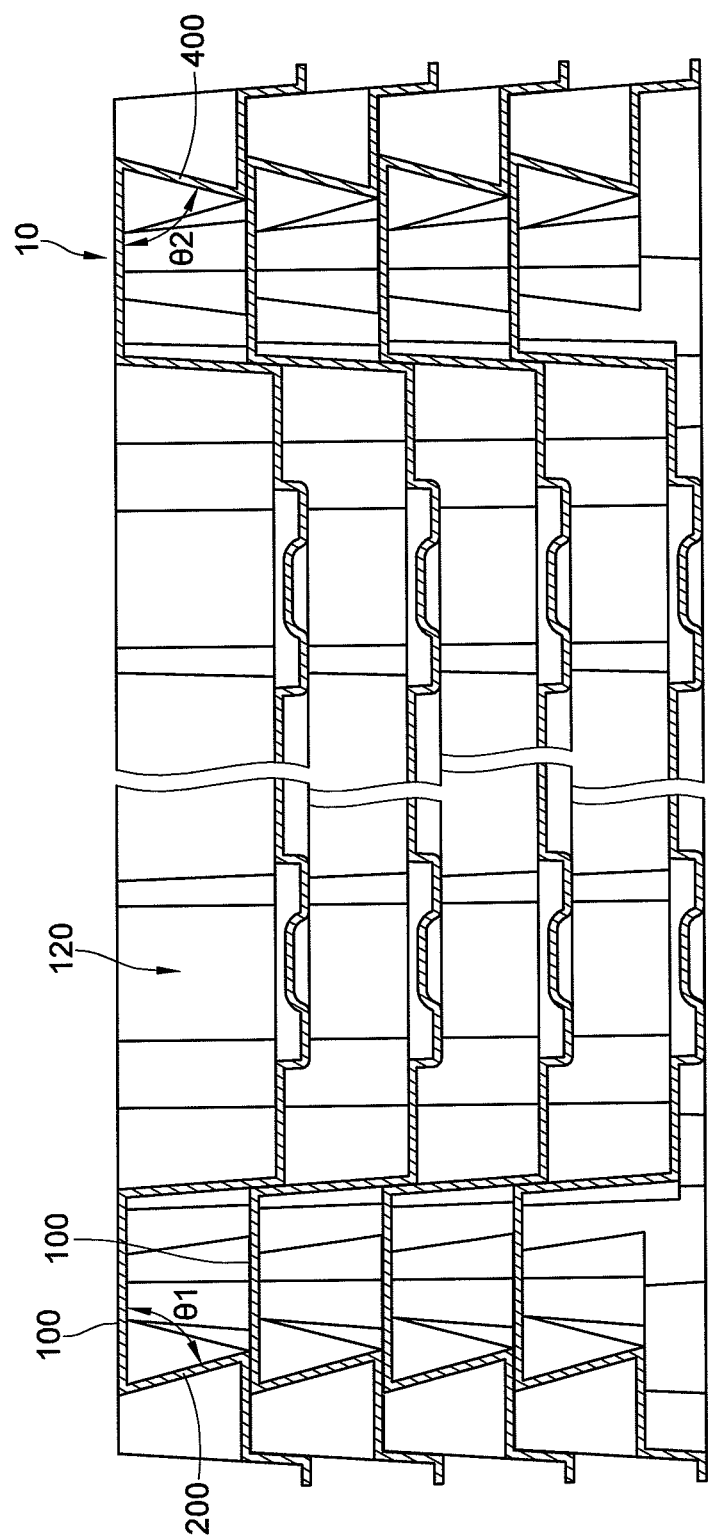
FIG. 18 is a cross-sectional schematic view of stacked carrier trays of FIG. 15.
Figure 19:
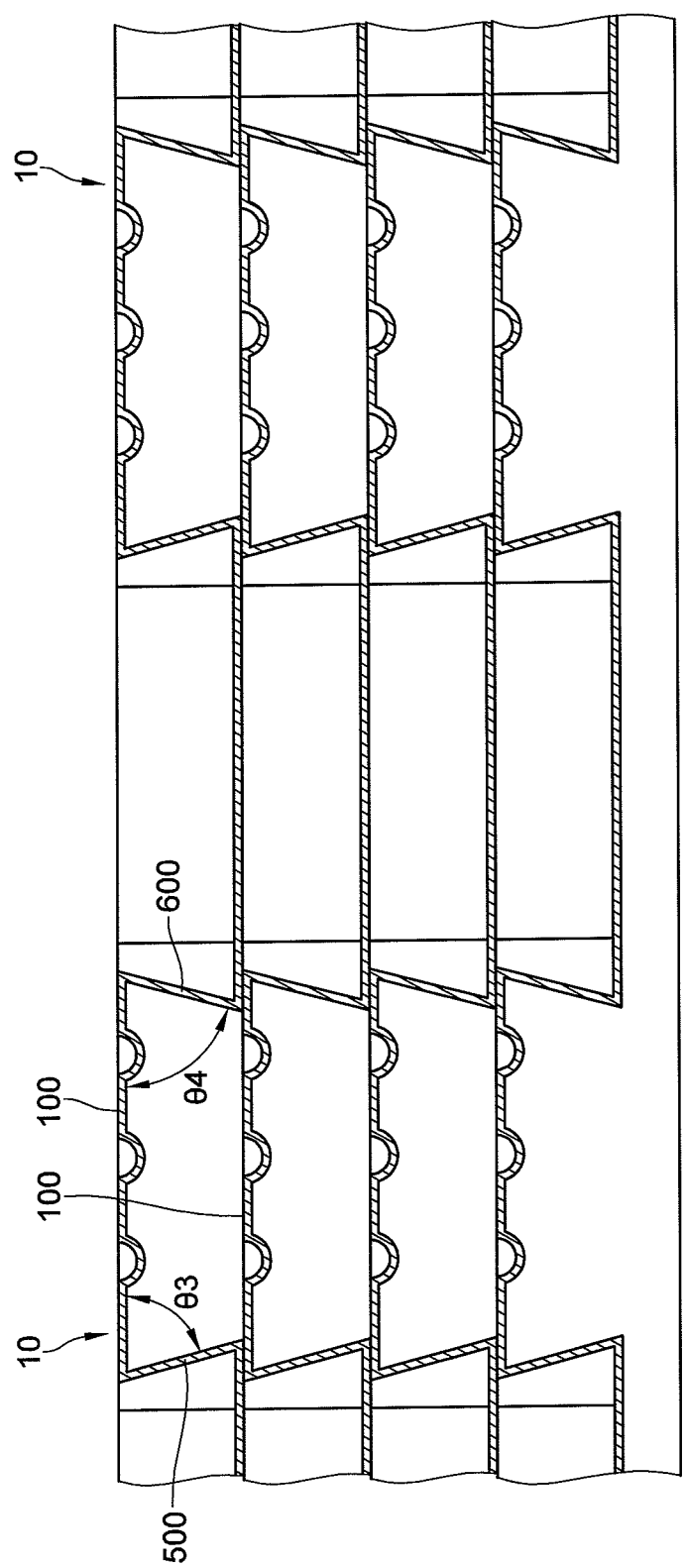
FIG. 19 is a cross-sectional schematic view of stacked carrier trays of FIG. 17.

Please refer to FIGS. 18 to 19. FIG. 18 is a cross-sectional schematic view of stacked carrier trays of FIG. 15. FIG. 19 is a cross-sectional schematic view of stacked carrier trays of FIG. 17. In the carrier tray 10 manufactured by the above-mentioned method, each included angle formed between the top plate 100 and the sidewalls 200, 400, 500, 600 may be between 73 to 78 degrees, respectively. Because each of the included angles of the carrier tray 10 manufactured according to the embodiments is less than the included angles of a conventional carrier tray, the proportion of the contact area (the lap between the two carrier trays) between each of the sidewalls 200, 400, 500, 600 of the upper carrier tray 10 and the top plate 100 of the lower carrier tray 10 is increased, thereby advancing the whole structural strength of the carrier trays 10 overlapped with each other.

To sum up, the method for manufacturing the carrier tray according to the embodiments is that before the first mold is removed, the restorer is disposed and leaned against the outer sidewall of the plastic film in advance, so when the first mold is removed, the restorer may provide an adverse flexible restoring force to push the plastic film to the original initial position. Therefore, the carrier tray manufactured by the method has the included angles formed by the top plate and each of the sidewalls therebetween and are between 73 to 78 degrees.

Moreover, in the carrier tray disclosed in the embodiments, the acute angles of between 73 to 78 degrees formed between the top plate and each of the sidewall is utilized to increase the distance between the sidewall of the upper carrier tray and the side edge of the top plate of the lower carrier tray, thereby, increasing the whole structural strength of the carrier tray overlapped with each other.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A method for manufacturing a carrier tray, comprising:
    softening a plastic film having thermoplastic properties and disposing the plastic film on a first mold, wherein the first mold comprises a top surface and a first lateral surface, the top surface comprises a recession and a first edge, the first lateral surface is connected to the top surface and extends from the first edge, and the first lateral surface and the top surface form a first included angle therebetween;
    attaching the plastic film to the top surface and the first lateral surface;
    disposing a restorer on an outer side of the first mold such that the plastic film attached to the first lateral surface is disposed between the first lateral surface and the restorer;
    removing the first mold from the plastic film, wherein a portion of the plastic film is pushed by the first lateral surface such that the restorer is moved from an initial position to a final position;
    pushing the plastic film from the final position to the initial position by the restorer; and
    cooling the plastic film.

2. The method according to claim 1, wherein the first included angle is between 73 and 78 degrees.

3. The method according to claim 1, before the step of removing the first mold from the plastic film, further comprising:
    sandwiching the plastic film in the recession between the first mold and a second mold by the second mold.

4. The method according to claim 3, between the steps of removing the first mold from the plastic film and cooling the plastic film, further comprising:
    separating the second mold and the restorer from the plastic film respectively.

5. The method according to claim 1, wherein the restorer is a flexible ring-shaped structure surrounding the first mold, and the ring-shaped structure includes a first inner surface facing the first lateral surface.

6. The method according to claim 1, wherein the first mold further comprises a second lateral surface, the top surface comprises a second edge facing the first edge, the second lateral surface extends from the second edge, the second lateral surface and the top surface form a second included angle therebetween, and the step of separating the first mold from the plastic film further comprises:
    pushing a portion of the plastic film by the second lateral surface such that the restorer is moved from the initial position to the final position.

7. The method according to claim 6, wherein the second included angle is between 73 and 78 degrees.

8. The method according to claim 1, wherein the first mold further comprises a third lateral surface and a fourth lateral surface, the top surface comprises a main body and a protruding part, the recession is disposed on the main body, the protruding part extends from the main body toward outside the main body, the protruding part comprises a third edge and a fourth edge facing to each other, the third lateral surface is connected to the top surface and extends from the third edge, the fourth lateral surface is connected to the top surface and extends form the fourth edge, the third lateral surface and the top surface form a third included angle therebetween, the fourth lateral surface and the top surface form a fourth included angle therebetween, and the step of separating the first mold from the plastic film further comprises:
    pushing a portion of the plastic film by the third lateral surface and the fourth lateral surface such that the restorer is moved from the initial position to the final position.

9. The method according to claim 8, wherein the third included angle and the fourth included angle are between 73 and 78 degrees respectively.

* * * * *